(12) United States Patent
Cordner et al.

(10) Patent No.: US 10,532,519 B2
(45) Date of Patent: Jan. 14, 2020

(54) CONTROLLED FORMATION OF CELLULAR MATERIAL AND APPARATUS

(71) Applicant: Fly Technologies Inc., Mississauga (CA)

(72) Inventors: Robert Brent Cordner, Toronto (CA); Glenn Hibbard, Toronto (CA)

(73) Assignee: Fly Technologies Inc., Toronto, Ontario (CA)

( * ) Notice: Subject to any disclaimer, the term of this patent is extended or adjusted under 35 U.S.C. 154(b) by 812 days.

(21) Appl. No.: 14/904,132

(22) PCT Filed: Jul. 9, 2013

(86) PCT No.: PCT/CA2013/050531
§ 371 (c)(1),
(2) Date: Jan. 11, 2016

(87) PCT Pub. No.: WO2015/003238
PCT Pub. Date: Jan. 15, 2015

(65) Prior Publication Data
US 2016/0144576 A1    May 26, 2016

(51) Int. Cl.
| | |
|---|---|
| *B29C 67/20* | (2006.01) |
| *B29K 101/10* | (2006.01) |
| *B29K 105/04* | (2006.01) |
| *B29K 105/06* | (2006.01) |
| *B29L 7/00* | (2006.01) |
| *B29L 22/00* | (2006.01) |
| *B29L 24/00* | (2006.01) |

(52) U.S. Cl.
CPC ........... *B29C 67/20* (2013.01); *B29K 2101/10* (2013.01); *B29K 2105/04* (2013.01); *B29K 2105/06* (2013.01)

(58) Field of Classification Search
CPC ..... B29C 67/20; B29C 44/005; B29C 44/027; B29C 44/0407; B29C 44/083; B29C 44/1219; B29C 44/1228; B29C 44/1233; B29K 2105/043; B29K 2105/045
See application file for complete search history.

(56) References Cited

U.S. PATENT DOCUMENTS

| | | |
|---|---|---|
| 2,502,304 A | 3/1950 | Rourke |
| 3,523,988 A | 8/1970 | Roehr et al. |

(Continued)

FOREIGN PATENT DOCUMENTS

| | | |
|---|---|---|
| CA | 2032719 | 6/1991 |
| CA | 1327259 | 3/1994 |

(Continued)

OTHER PUBLICATIONS

International Search Report dated Feb. 28, 2014.
(Continued)

*Primary Examiner* — Stella K Yi
(74) *Attorney, Agent, or Firm* — Rowand LLP (57) ABSTRACT

A hardened cellular material formed by stretching a stretchable material is disclosed. Fluid is allowed to enter softened stretchable material through apertures in a stretching surface to define voids at locations in the stretchable material at locations defined by the apertures. The stretchable material is then hardened with voids at locations controlled/defined by the apertures.

19 Claims, 10 Drawing Sheets

(56) References Cited

U.S. PATENT DOCUMENTS

| | | | | |
|---|---|---|---|---|
| 3,919,381 | A | * | 11/1975 | Smarook .............. B29C 67/00 206/201 |
| 4,315,051 | A | | 2/1982 | Rourke |
| 5,968,643 | A | * | 10/1999 | Topolkaraev .......... C08J 9/18 428/305.5 |
| 6,322,651 | B1 | | 11/2001 | Phelps |
| 6,602,062 | B1 | | 8/2003 | Torii et al. |
| 2006/0119175 | A1 | | 6/2006 | Garza |
| 2014/0065351 | A1 | | 3/2014 | Cordner et al. |

FOREIGN PATENT DOCUMENTS

| | | |
|---|---|---|
| CA | 2302584 | 3/1999 |
| EP | 624447 | 11/1994 |
| EP | 1023981 | 8/2000 |
| EP | 2311629 | 4/2011 |
| JP | 1982176132 | 10/1982 |
| JP | S57176132 | 10/1982 |
| JP | 57-176132 | 11/1982 |
| JP | 2001079900 | 3/2001 |
| JP | 2001-162692 | 6/2001 |
| JP | 2005199439 | 7/2005 |
| JP | 2006326860 | 12/2006 |
| WO | 9914264 A1 | 3/1999 |
| WO | 2012162784 | 12/2012 |
| WO | WO2012162784 | 12/2012 |

OTHER PUBLICATIONS

International Search Report dated Feb. 24, 2012.
SIPO, CN Office Action relating to CN application No. 201380078900.1, dated Jan. 9, 2017.
EPO, Extended European Search Report relating to 13889339.1, dated Jan. 1, 2017.
JPO, Japanese Office Action relating to Japanese application No. 2016-524636, dated Mar. 10, 2017.

* cited by examiner

CONTROLLED FORMATION OF CELLULAR MATERIAL AND APPARATUS

FIELD OF THE INVENTION

The present invention relates to cellular materials and methods of, and apparatus for, forming such materials.

BACKGROUND OF THE INVENTION

Cellular materials have varied applications and are useful in many industries including aerospace, automotive, packaging, construction, and other industries. A common type of cellular materials is foamed plastics.

A common technique for producing cellular materials creates gas cells inside a plastic material before the plastic material is solidified. Typical known foaming techniques involve the use of a blowing agent which creates gas cells inside the material during the material manufacture process; and the foamed material is then subjected to a forming process such as a thermoforming process to obtain the desired product shape.

A further cellular material formation technique is disclosed in PCT Publication WO 2012/162784, the contents of which are incorporated herein by reference. As disclosed, a material with a cellular structure is formed from melt-stretched materials such as plastic granules. The melt stretchable material is compressed between stretching surfaces and is melted to form viscous molten layers attaching the material to the surfaces. Melted central portions of the material are stretched by moving the surfaces away from one another. A cellular structure is thus formed between.

The resulting structure has generally randomly sized, shaped, distributed and positioned cells. Further controlling one or more of size, shape, distribution and position of cells would be desirable.

SUMMARY OF THE INVENTION

Exemplary of an embodiment of the present invention, a fluid is allowed to enter softened stretchable material through apertures in a stretching surface to define voids at locations in the stretchable material at locations defined by the apertures. The stretchable material is then hardened with voids at locations controlled/defined by the apertures. Typically, there is a one to one correspondence between aperture and voids.

In accordance with an aspect of the present invention, there is provided a method of forming a cellular slab. The method comprises: providing two opposing surfaces, with at least one of the surfaces comprising apertures extending therethrough; providing a softened stretchable material between the two opposing surfaces, wherein the stretchable material adheres to the two opposing surfaces; contacting the softened stretchable material with the two opposing surfaces; moving at least one of the two opposing surfaces away from the other to stretch the softened stretchable material between the two opposing surfaces, while allowing a fluid to enter the softened stretchable material through the apertures to define voids in the stretchable material at locations defined by the apertures; solidifying the stretchable material to form the cellular slab.

In accordance with another aspect of the present invention, there is provided an apparatus comprising: two opposing platens, with at least one of the two opposing platens comprising apertures extending therethrough; a linkage to move at least one of the two opposing platens away from the other to stretch a softened stretchable material placed between and in contact with said two opposing platens, while allowing a fluid to enter the stretchable material through the apertures to define voids in said stretchable material at locations defined by the apertures.

In accordance with yet another aspect of the present invention, there is provided a polymeric slab comprising: first and second opposed surfaces; a solidified, stretched polymeric core, extending between the first and second opposed surfaces; a plurality of voids at defined locations within the solidified stretched polymeric core; holes each one extending from one of the first and second opposed surfaces into an associated one of the plurality of voids.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION

Figure 5A:
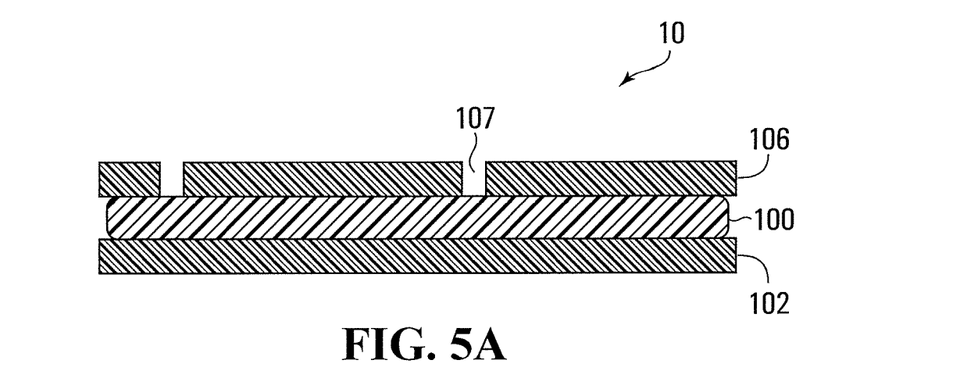
FIG. 5A to 5C are cross-sectional views of the apparatus of FIGS. 1 to 4, in operation to form bulk cellular board, exemplary of embodiments of the present invention.
Figure 5B:
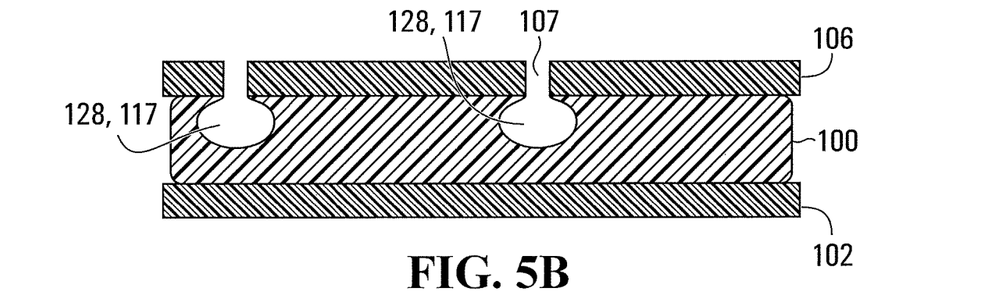
Figure 5C:
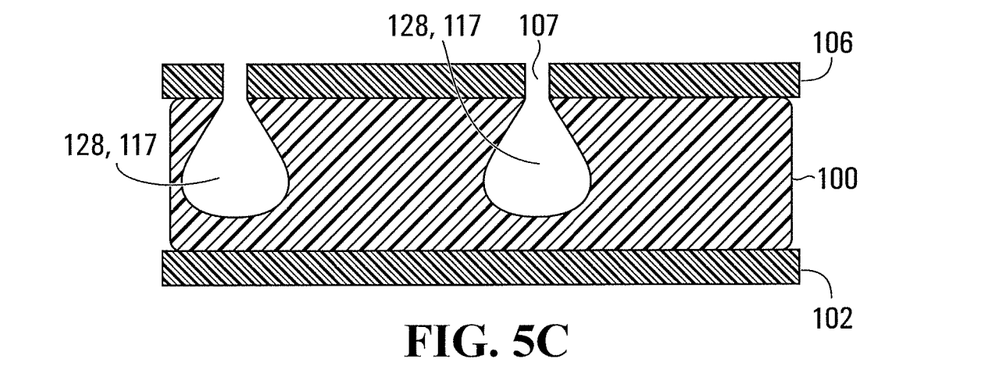
Figure 6:
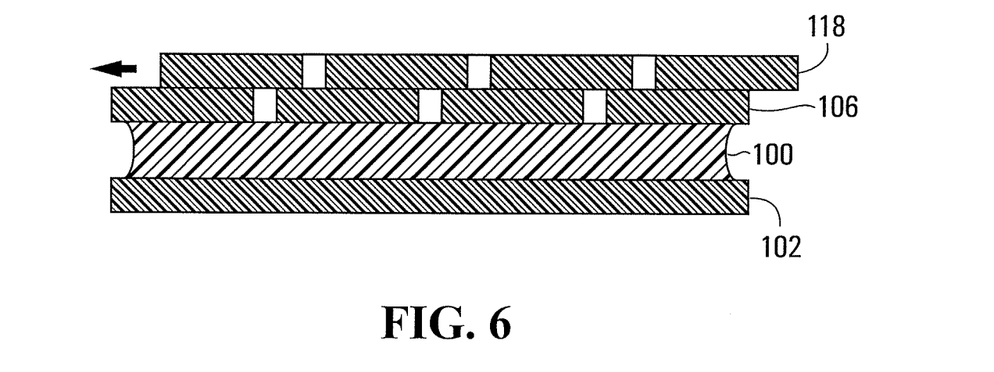
FIG. 6 is a cross-sectional view of the apparatus of FIGS. 1 to 4, equipped with a valve plate, in operation to form bulk cellular board, exemplary of embodiments of the present invention.

An exemplary embodiment of the present invention relates to a method of, and apparatus 10 for forming a cellular material, as illustrated in FIGS. 1 to 4. Example formed cellular material may take the form of bulk cellular board or slab 120, as depicted in FIG. 6. In the embodiment of FIGS. 1-6, the cellular material may be formed, at least in part, of thermoplastic, and may thus be melt-stretched.

As will become apparent, example cellular material may alternatively be formed of thermosetting material (e.g. a thermosetting polymer or plastic, such as epoxy resin, polyester, polyurethane, phenolics, epoxy, synthetic rubber, or the like).

Figure 1:
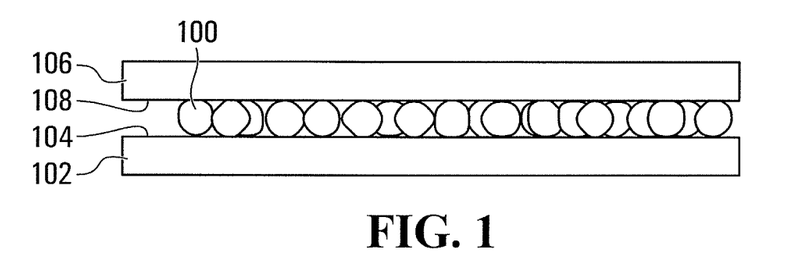
FIG. 1 is a schematic side elevation view of an apparatus for forming a cellular material by stretching, exemplary of an embodiment of the present invention.
Figure 2:
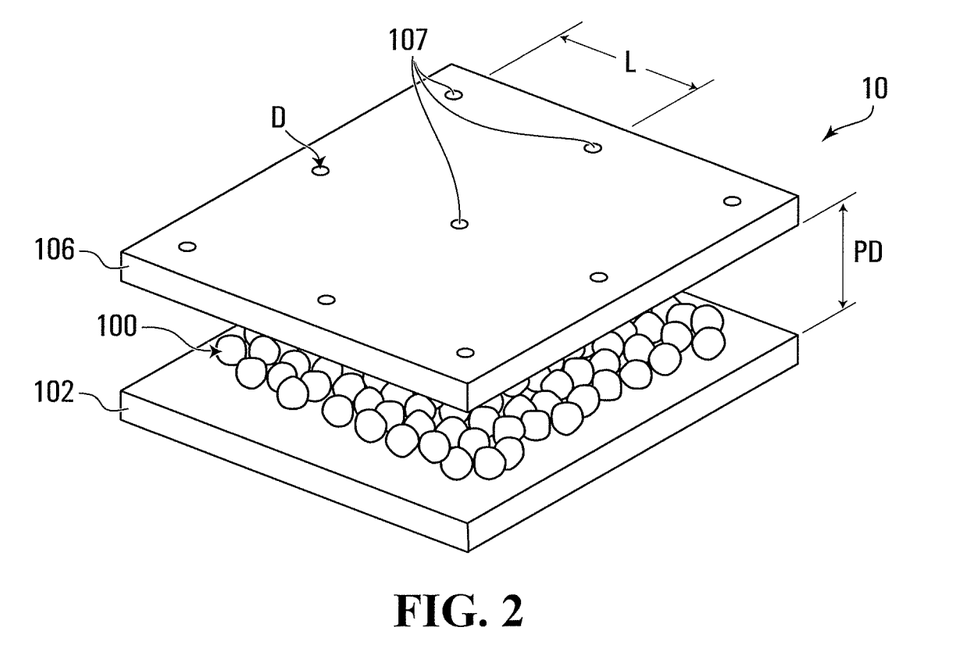
FIG. 2 is a perspective view of the apparatus of FIG. 1.
Figure 3:
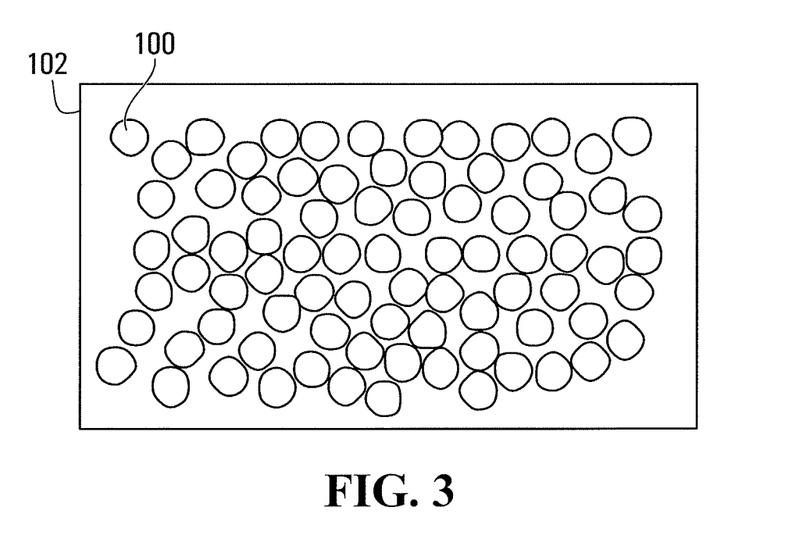
FIG. 3 is a schematic top plan view of a portion of the apparatus of FIG. 1.
Figure 4:
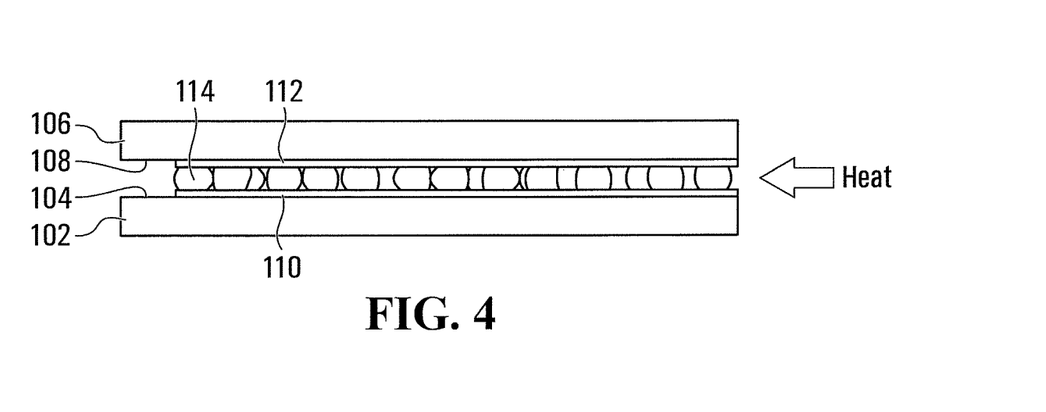
FIG. 4 is a schematic side elevation view of the apparatus of FIG. 1, illustrating the application of heat to melt a material.

As illustrated in FIGS. 1 and 2, a mass of stretchable material 100 is placed between a lower platen 102 having an upper surface 104 and an upper platen 106 having a lower surface 108 of apparatus 10. Surfaces 104 and 106 are generally flat and substantially parallel, and may be referred to as the stretching surfaces herein.

Stretchable material 100 may have any suitable shape or size. Stretchable material 100 may, for example, be formed of a melt stretchable material comprising granules, as exemplified in FIG. 3. While generally spherical granules are depicted, granules of other shapes and other materials may also be suitable in different embodiments. For instance, cubic or randomly shaped granules may also be used. Alternatively, stretchable material 100 may take the form of a sheet, powder, gels, or bulk material.

As noted, stretchable material 100 may include a thermoplastic polymer. As will be appreciated, however, stretchable material refers to a material that has relatively high viscous strength so that the softened material is capable of undergoing continuous and substantial deformation under a stretching force without rupture. Suitable stretchable polymers, that are melt-stretchable, include polypropylene (PP) and polyethylene (PE). As will become apparent below, melt-stretchable material should have a melting temperature well above room temperature, and a relatively high viscosity in a melt state, low melt flow index (MFI), or high melt strength. As can be appreciated by those skilled in the art, melt flow index, melt flow rate and melt index are often used interchangeably to refer to the same property.

For instance, a polypropylene (PP) with a melt strength of about 0.31 N may be suitable. Melt strength may be measured according to ISO 16790 (see ISO 16790:2005 Plastics—Determination of drawing characteristics of thermoplastics in the molten state. International Organization for Standardization. 2005).

Optionally, stretchable material 100 may include reinforcing additive, such as chopped fibers, carbon fibers, iron, steel or other alloy fibers, glass fibers, nano-particles or the like. The reinforcing additive may be added to stretchable material 100, prior to melting or thereafter. For example, the granules may have the reinforcing additive already embedded therein. Alternatively, the reinforcing could be added after softening stretchable material 100.

Stretchable material 100 may be compressed between platen 102 and 106. Granules may initially be closely packed or loosely packed between platens 102 and 106 to form stretchable material 100, as best illustrated in FIG. 2. The nature and extent of packing may depend on the desired product. For example, loosely packed granules may provide a less dense final product. Granules should be sufficiently close to one another to define a stretchable material 100 that an integral final product can be obtained.

Stretchable material 100 should also have the desired properties for the particular application in which the resulting product is to be used, as will be understood by those skilled in the art. Optionally, different additives may be incorporated into stretchable material 100, as will be further discussed below.

Platens 102 and 106 may be made of any suitable material. For example, a metal such as aluminum may be used. Depending on the stretchable material 100 used, surfaces 104, 108 of platens 102 and 106 are selected such that a molten surface layer of the material is sufficiently adhesive to surfaces 104, 108, for reasons which will become apparent. It may be convenient if the stretchable material in a solid state can be easily separated from surfaces 104 and 108. If necessary or desirable, a surface treatment (including shaping or contouring) may be applied to surfaces 104, 108 to provide the desired adhesiveness and compatibility with the melt-stretchable material.

As further illustrated in FIG. 2, at least one of platens 102 and 106 includes a plurality of apertures: apertures 107 are depicted on top platen 102. Apertures 107 extend through platen 102, and allow the injection of air from the top surface of platen 102, to the region between platens 102 and 106 at defined locations, as platens 102 and 106 are moved apart to stretch melt-stretchable material 100. A fluid—e.g. air—introduced through apertures 107 defines cells 128 at defined locations in resulting stretched, set melt-stretchable material 100.

As will become apparent, the pattern of apertures 107; the relative alignment of apertures 107 to apertures in an opposite platen (as discussed below); the shape (e.g. cross-sections) of apertures 107, may all be chosen/controlled to affect the resulting cellular material, as further detailed below.

A linkage (not shown) may move platen 102 relative to plate 106, typically in a direction generally normal to surfaces 104, 106, allowing the vertical distance between platens 102, 106, and thus the gap between platens 102, 106 to be varied. The linkage may be mechanical, and may include a worm gear or drive, moveable arm, piston or other coupling between platens 102 and 106, to allow these to move relative to each other to adjust the distance between the platens.

In operation, as shown in FIGS. 4, and 5A-5C, stretchable material is softened. This may be accomplished by applying heat to melt-stretchable material making up stretchable material 100 to sufficiently soften and melt the thermoplastic material, such that a viscous molten layer 110 (FIG. 4) is formed on surface 104 and a viscous molten layer 112 is formed on surface 108.

Heat may be applied through platens 102 and 106, using for example, electric, gas or other heat source. A hot gas or air may also be fed to melt-stretchable 100 through the space between surfaces 104, 108 to heat the granules. The applied heat and the temperature in the melt stretchable material 100 should be controlled so that the central portions 114 of stretchable material 100 is also softened and melted but does not rupture (break apart) or lose its stretchability. Softened stretchable material 100 may be compressed to form a continuous sheet of molten mass without substantial air gaps.

In some embodiments, stretchable material 100 may be first softened and then compressed. In other embodiments, stretchable material 100 may be first compressed between stretching surfaces 104, 108 and then softened while continuing to apply the compression pressure. The compression pressure applied to stretchable material 100 may be adjusted as stretchable material 100 softens.

Possibly, stretchable material 100 could be melted/softened in the absence of platen 106, thereby allowing the easy addition of reinforcing material —such as fibers, discussed above.

Molten surface layers 110 and 112 are adhesive to surfaces 104 and 108: molten layer 110 attaches lower ends of melted stretchable material 100 to surface 104 and molten layer 112 attaches upper ends of melted stretchable material 100 to surface 108. To form or control the thickness of molten layers 110, 112, the distance between surfaces 104 and 108 may be adjusted before, during, or after applying heat and melting stretchable material 100.

As shown in FIGS. 4 and 5A-5C, platen 106 is next moved upward relative to platen 102, to stretch the melted central portion of stretchable material 100 to form a cellular structure 116, between stretching surfaces 104 and 108. As platen 106 is raised, platen 102 may be fixed in place, or simultaneously lowered. Platens 102 and 106 may be moved in any suitable manner to move stretching surfaces 104 and 108 away from each other in order to stretch melt stretchable material 100, using for example the above described linkage. The final distance between stretching surfaces 104 and 108 may be selected and defines the desired thickness of a resultant slab 120.

Further, as platens 102, 106 separate relative to each other, a fluid (e.g. air) enters stretchable material 100, through apertures 107. The air defines cells 128 in the form of voids in stretchable material 100, and thus slab 120, as best illustrated in FIGS. 5B to 5C. As illustrated, with apertures only on platen 106, air entering stretchable material 100 defines pockets 117 in slab 120 (FIGS. 6 and 7).

Figure 7:
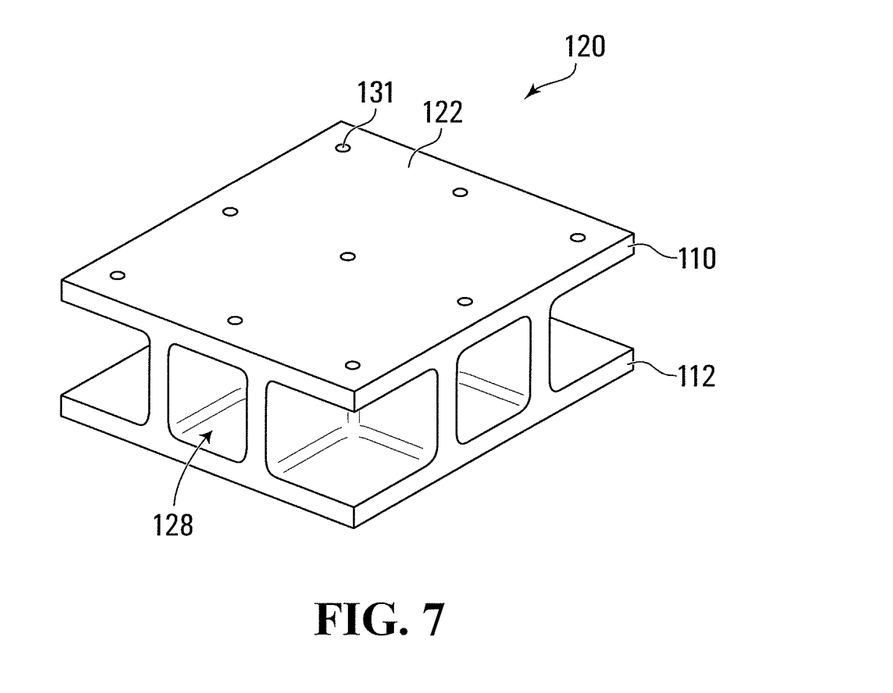
FIG. 7 is a perspective view of a cellular slab formed using the apparatus of FIGS. 1 to 4, exemplary of an embodiment of the present invention.

The size, shape and location of cells 128 in the form of pockets 117 will depend on the location of apertures 107, with each cell 128/pocket 117 extending from an aperture 107, and a resulting hole 131 in the top surface of formed slab 120 (depicted in FIG. 7).

The size of each cell 128 may additionally depend on the viscosity of stretchable material 100 when heated; the rate at which heat stretchable material 100 is stretched (i.e. the rate at which platen 106 is moved away from platen 102); the ambient pressure, temperature, speed and density of the injected fluid/air; the orientation of platens 102, 106 with respect to gravity; and other factors.

Optionally, as depicted in FIG. 6, fluid flow to apertures 107 may be further controlled. In the depicted embodiment, a further platen 118 is slideably mounted on platen 106, and acts as valve controlling flow of fluid to each aperture 107. Platen 118 includes openings that align with apertures 107 on platen 106. As platen 118 is moved laterally on platen 106, fluid flow to apertures 107 is opened and closed. The degree of alignment of openings in platen 106 and platen 118 will control the degree of fluid flow to material 100. In this way, fluid flow to apertures 107 may be limited during initial movement of platens 102, 106. This may be beneficial for higher viscosity stretchable material 100. In other embodiments, fluid flow may be increased or decreased as platens 102 and 106 are moved relative to each other. As will be appreciated, fluid flow to apertures 107 may be limited in other ways without use of platen 118, readily appreciated by those of ordinary skill—for example by moving a platen (not illustrated) having no openings toward and away from platens 106; by including individual valves/tubes (not illustrated) to feed fluid to apertures 107; or by providing a manifold (not shown) that feeds apertures 107, and that may be opened or closed.

As will be appreciated, the shape of apertures 107 may be readily varied. Typically, but not necessarily, the cross sectional shapes of apertures 107 through platen 106 will be uniform. For example, in alternate embodiments, the apertures 107' in an alternate platen 106' that may be used in place of platen 106 may be made square (e.g. FIG. 9A); chevron shaped apertures 107" in platen 106"(FIG. 9B); or rectangular/slotted (FIG. 9C) apertures 107''' in platen 106'''. The shape of the apertures will ultimately influence the shape and size of cells 128/pockets 117. Other, shapes of apertures 107 will be apparent to those of ordinary skill.

Possibly, as platens 102, 106 are moved further apart, material between pockets 117 may thin and additional voids—in the form secondary voids defined by webbing extending from pockets 117 (not specifically illustrated) may form. Possibly, the additional voids may connect pockets 117 to form connected cells. Typically however, pockets 117 will form a closed cell material—with each pocket 117 defining a cell 128, isolated from another.

As can now be appreciated, it may be convenient if the stretchable material 100 and the platen material are selected so that the softened stretchable material will be tacky and sufficiently adhesive to the stretching surfaces, without the need to apply a surface treatment to the stretching surfaces. For example, molten PP is found to be sufficiently adhesive to aluminum surfaces.

As now can also be understood, the softened stretchable material should have sufficient viscosity or melt strength to allow the central portions 114 to be stretched to the desired extent without splitting. Likewise, the stretchable material should be sufficiently viscous to allow formation of cells 128, therein. As well, the stretchable material should 1) adhere to platen 102, 106 during stretching, 2) retain continuity during stretching, and 3) solidify after stretching, yielding the final internal cellular architecture.

Once stretching surfaces 104 and 108 are moved away to the selected distance, the distance may be maintained and the stretched material 100 may be cooled to solidify and form slab 120. The stretched material may be air cooled. For mass production, the cooling process may be accelerated to improve production cycle time.

In some embodiments of the exemplary method, it is not necessary to use any blowing agents, adhesives, or other additives. It is also not necessary to provide separate foaming and forming processes. The exemplary method described herein can thus be convenient and simple to perform.

As shown in FIG. 7, the solidified material forms slab 120 having skins 122, 124 connected by a cellular core 126. Skins 122, 124 are formed (solidified) from layers 110 and 112, and cellular core 126 is formed (solidified) from cellular structure 116. The cellular core 126 defines cells 128 formed from air. Cells 128 form at about the location of apertures 107 and extend from holes 131, formed in the surface of slab 120, previously in contact with surface 108 of plate 106. As cells 128 extend from the locations of apertures 107, the voids may be regularly spaced, at determined locations, and have controlled size. For example, apertures 107 may be arranged on a square, rectangular or other grid. Cells 128 will be similarly arranged within core 126. Accordingly, as will be appreciated, if a particular arrangement of cells 128 is desired—e.g. at particular locations, apertures 107 may be arranged accordingly Skins 122, 124 may be denser and less porous than cellular core 126. For example, skins 122, 124 may have a porosity of about 2% or less, and cellular core 126 may have a porosity of about 10% or higher. In selected embodiments, the core porosity may be about 20% or higher. In some embodiments, the core porosity may be about 50% or higher. In some embodiments, the core porosity may be about 85% to about 95%, or even higher. Conveniently, then, the resulting cellular slab 120 may have a very low density, and be very light in weight, while having predictable structural characteristics—including desirable strength. Conveniently, the solidified thermoplastic material may be easily detached from surfaces 104 and 108. In some embodiments, skins 122, 124 may spontaneously detach from stretching surfaces 104 and 108.

Possibly, a small residue of melt stretchable material may coat the inner wall of apertures 107/107'/107" and may need to be removed from a final solidified slab 120, by sanding, filing or otherwise smoothing or machining the surface(s) of slab 120.

As can be understood, the thickness of slab 120 may be adjusted by adjusting the final distance between the stretching surfaces 104 and 108 when the material is solidified; and the porosity or relative density in the cellular core 126 may be controlled by adjusting the distribution and location of apertures 107 and the final distance between the stretching surfaces 104 and 108.

Slab 120 may be further processed, as detailed in WO 2012/162784. For example, an external face sheet (not shown) may be attached or bonded to one or each of the sides of slab 120. The face sheet may be made of any material, such as polymers, metals, or the like. A thermoplastic polymeric face sheet may be attached to slab 120 without using an external adhesive. Face sheets or other treatment of the board may be provided to reinforce or protect slab 120, modify the appearance of the final product, or to provide any other functionality as will be understood by those skilled in the art. In selected embodiments, the granules may be placed between pre-formed face sheets during the stretching process to form an integral board. In selected embodiments, separate face-sheets may be attached to the board after the stretching process.

The edges or open sides of slab 120 may be further shaped or sealed by heating or applying an external material such as a sealing sheet or film.

Slab 120 may be re-shaped such as cut or reformed to provide a desired product shape or size. For example, boards of standard sizes may be formed and supplied to end users and be cut into the desired sizes by the end users.

Conveniently, slab 120 can be made to have a high porosity (and consequently light weight) and strong mechanical strength. In some embodiments, the porosity in the cellular core may be in the range of about 10% to about 95%, or even higher, depending on the distribution/arrangement of apertures 107. Porosity may be calculated as the ratio of total pore volume and total volume, and may be indicated by relative density, which may be calculated from the ratio of the density of slab 120 to the density of the granule material. The density of a material may be measured in any suitable manner known to those skilled in the art. For example, the density may be determined by measuring the weight and volume and dividing the measured weight by the measured volume of the material in question. The relative density of the cellular material may be in the range of about 10% to about 95% in selected embodiments.

Slab 120 may be convenient to reform, such as by applying heat or using a suitable plastic reforming technique known to those skilled in the art. For example, a cellular board described herein may be stamped with a hot die to obtain parts with desired shapes. Conveniently, a part stamped from the board or a reformed board may substantially retain the porosity and mechanical strength of the initial board. In at least some embodiments, when slab 120 is mechanically damaged, it can be conveniently repaired by re-facing, re-forming, or fusing with a new part. For example, it is possible to re-stretch a damaged portion of the board by heating the damaged portion, attaching the skins of the damaged portion to two stretching surfaces, and moving the stretching surfaces away from one another to stretch the core of the damaged portion. The edges of slab 120 may also be sealed by, for example, pinching the edge with a hot die. When all the edges are sealed, the sealed slab may be able to float in water. Either the board (sheet) or a die-stamped part from the board can be fully sealed to allow floatation. Sealed boards and parts can also prevent air, moisture and dirt from entering into the cellular structure inside the boards or parts. Multiple boards may be fused together to form an integrated product, such as during a die-stamping process. For example, multiple boards may be used to fill a die cavity. Fusing of the boards may occur at the edges of the boards or at other locations where the boards are sufficiently compressed by the die.

As now can be appreciated, modifications to the exemplary method described above may be made. In general, the methods described herein may be modified to provide other cellular materials containing a cellular structure formed from stretched material. For example, different materials may be used, and different stretching apparatus or process may be used. Further, cellular materials of different shapes may be formed. Depending on the materials used, softening of the melt stretchable material may be effected by a method other than applying heat, and solidification may be effected by a method other than cooling.

For example, as noted, stretching and cellular formation techniques may be equally applicable to thermosetting materials. In such embodiments, stretchable material 100 may take the form of thermosetting stretchable material that adheres to platens 102, 106. Example thermosetting materials may include epoxies, epoxy resin, polyester, polyurethane, phenolics, epoxy, synthetic rubber, or the like.

For typical thermosetting materials, platens 102, 106 would not need to be heated, as thermosetting materials initially come in a soft/viscous form, and are activated as a result of a chemical reaction, rather than heating/cooling. Viscous, stretchable thermosetting material may be stretched by moving platens 102, 106 away from each other. Again, air could be introduced through apertures 107 to produce cells in the stretchable thermosetting material. The finished stretched material may then harden by curing to form a final slab, like slab 120, formed however of cured thermosetting material, rather than set heat stretch material. Optionally, platens 102, 106 could be heated to assist in curing the thermosetting material after stretching.

In some embodiments, stretchable material 100 may be made of other materials that are suitable for stretching, as long as the materials have suitable characteristics. First, the material can be made viscous and adhesive to the stretching surface (such as surfaces 104, 108) and have sufficient strength or viscosity in this state to allow stretching of the central portion to the desired length without splitting or melting away. In this regard, an additive may be added to the material to improve its viscosity, stickiness, or other properties. Pre-melted granules may be used in some embodiments, such as by applying individual droplets of the material at different spots on the lower stretching surface, although such a process may be less convenient as compared to dispersing solid granules on the stretching surface. Secondly, the material can be solidified and remains in the solid state at the normal use conditions. In this regard, the described thermoplastic and thermosetting materials are convenient to use. However, other materials may also be useful. As noted, resins may be used and may be solidified by curing. Stretchable materials that are tacky when softened but non-adhesive when solidified may be convenient to use, as surface molten layers may be conveniently pulled away from each other by the stretching surfaces due to adhesion between the molten layers and the stretching surfaces, while the solidified skins can be conveniently separated from the stretching surfaces once cooled.

To assist the formation of the skin layers with a generally uniform thickness, the stretching surfaces 104/108 may be vibrated transversely (i.e. in the direction parallel to the stretching surface).

Stretching surfaces 104/108 may be provided in different forms. For example, platens 102 and 106 may be replaced with other suitable pulling members or devices. The resulting stretching surfaces may be curved so that the product material has a desired surface shape. The two opposing stretching surfaces may be inclined at a limited angle so that the product material has a varying thickness. Two or more separate stretching devices may be provided on one side (e.g. the upper side) so that different portions of surface 108 may be raised to different heights to produce a board with stepped-thickness. Again apertures through a stretching surface may allow for injection of air/fluid as a slab is formed, to define voids therein.

While it is convenient that the softened stretchable material 100, is stretched vertically, in different embodiments it may be possible to stretch the material in other directions if the softened material is of sufficient melt strength or viscosity and sufficiently adhesive to the stretching surfaces to prevent undesired lumping, dripping, or bending of the central portions.

Cellular materials with different thickness and size may be produced according to exemplary embodiments described herein. Instead of board materials, other bulk cellular materials, such as sheet materials, block materials, spherical materials, annular materials or the like may also be produced by stretching. As used, herein the term slab is intended to describe all such bulk materials.

Figure 8A:
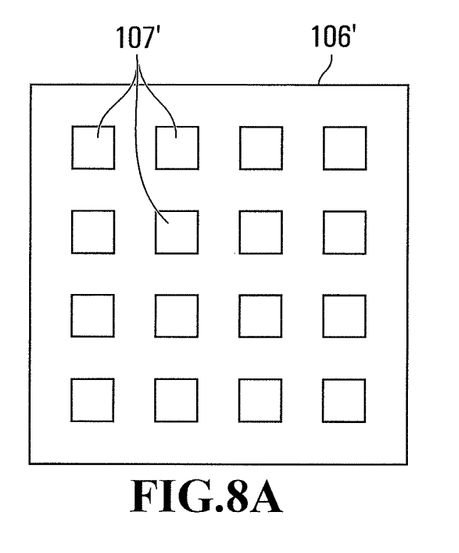
FIG. 8A to 8C are schematic views of alternate platens for use in the apparatus of FIGS. 1 to 4.
Figure 8B:
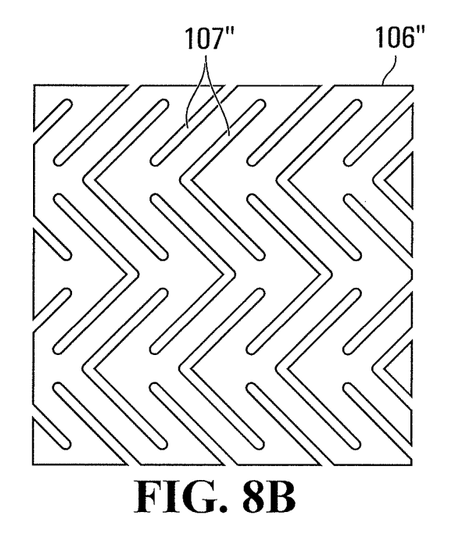
Figure 8C:
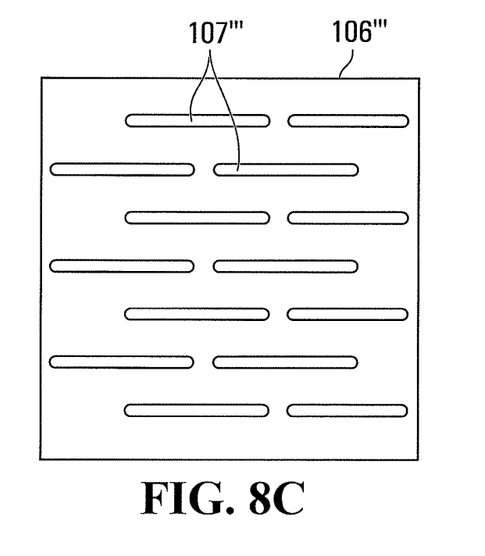

In alternate embodiments, cells/voids may be defined by introduction of a fluid through both opposing platens. For example, bottom platen 102 of FIGS. 1 to 4 may be replaced with platen 102' (FIG. 8A-8C) or platen 102" (FIGS. 10A-10D).

FIGS. 9A-9C and 10A-10C schematically illustrate opposed platens 106/102' and 106/102" each including apertures 107/109'/109" moved away from each other by way of a mechanical or other linkage.

Each of platen 102'/102" may comprise apertures 109'/109" (like apertures 107 in platen 106), that co-operate with apertures 107 in the formation of cells 128. In this way, cells 128 may be formed from the bottom platen 102 and from the top platen 106, in a stretchable material 100 by air or another fluid injected through apertures 107 and 109'/109", simultaneous, as platen 102'/102" and platen 106 are moved away from each other to stretch a stretchable material, as illustrated in FIGS. 9A-9C, and 10A-10D.

Figure 9A:
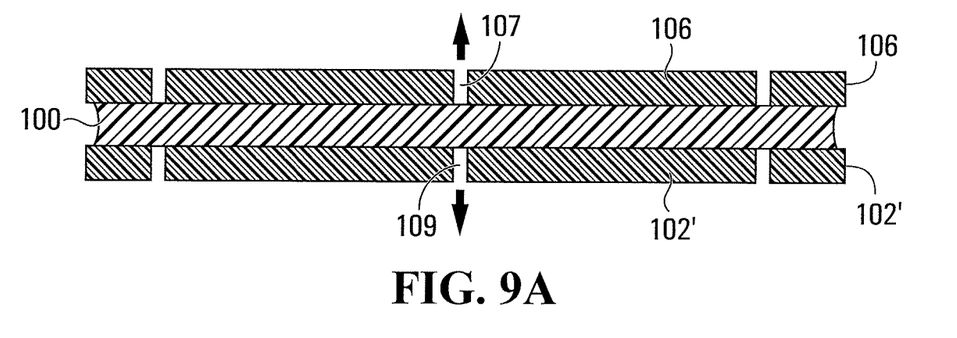
FIG. 9A to 9C are cross-sectional side views of an alternative apparatus in operation to form a cellular slab, exemplary of embodiments of the present invention.
Figure 9B:
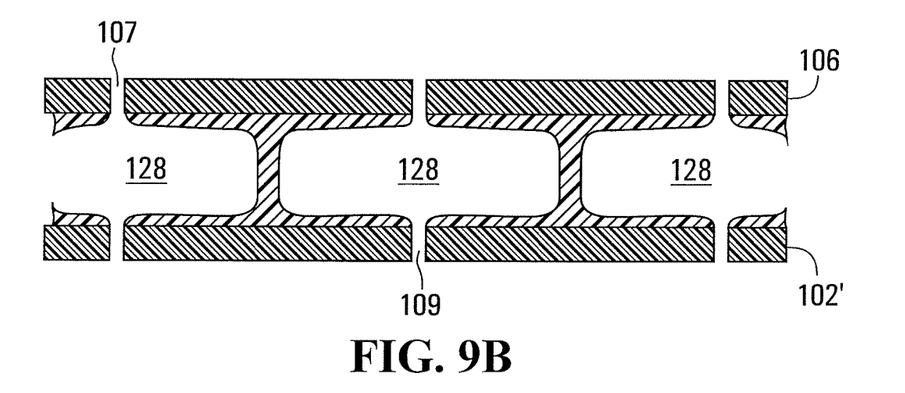
Figure 9C:
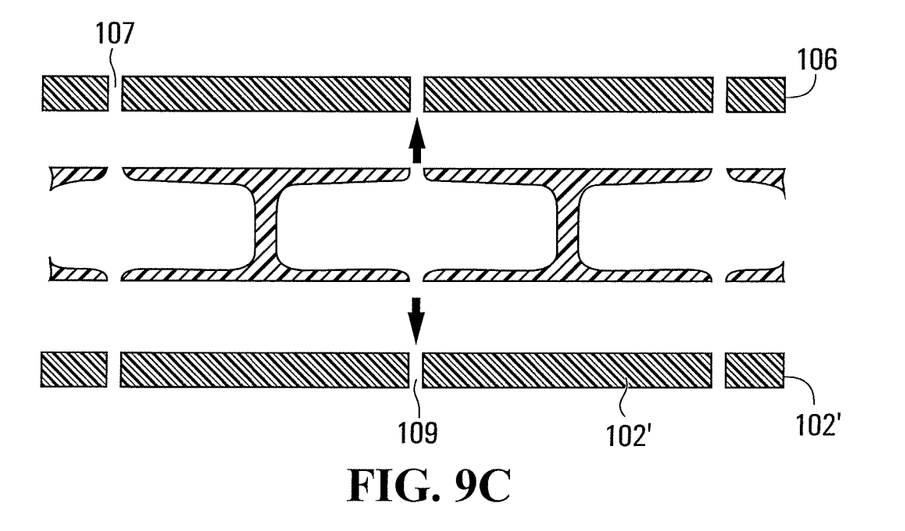

Apertures 107 may be generally aligned with apertures 109' in platen 102' (as illustrated in FIGS. 9A-9C) or apertures 107 may be offset from apertures 109" in platen 102" (as illustrated in FIGS. 10A-10D).

Figure 10A:
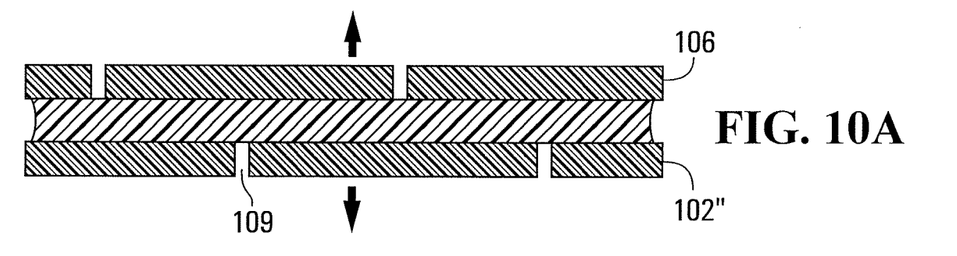
FIG. 10A to 10D are cross-sectional side views of another alternative apparatus, in operation to form a cellular slab, exemplary of embodiments of the present invention.
Figure 10B:
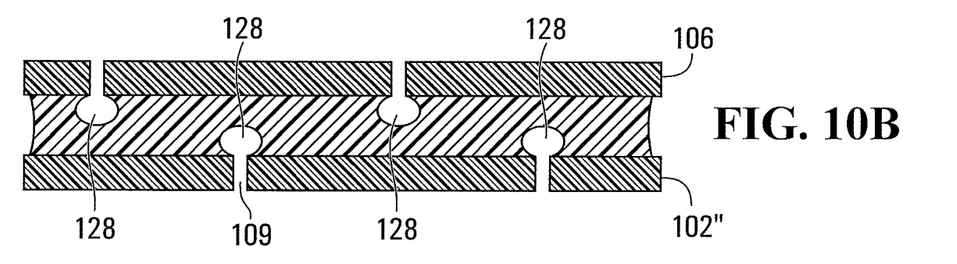
Figure 10C:
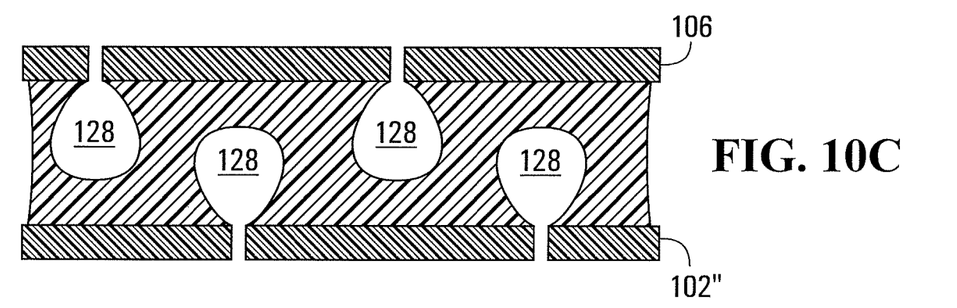
Figure 10D:
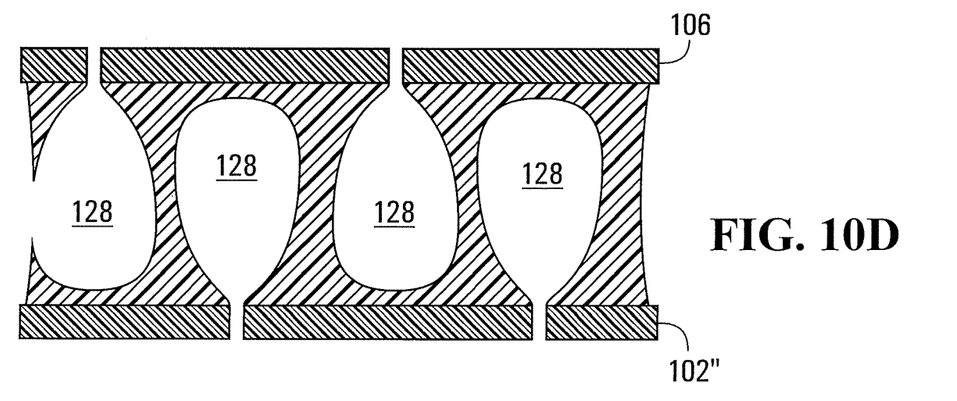

Offset apertures 107 and 109" may, for example, be formed so that cells 128 are arranged to define cells 128 as illustrated in FIG. 10D.

Alternatively, by aligning apertures 107 in platen 106 and apertures 109' in platen 102, cells 128 may define columns in stretchable material 100 and resulting slab. As illustrated, each resulting column/cell 128 extends from a hole in each opposing surface of the resulting material.

Again, stretchable material 100 may be melt-stretchable or thermosetting.

Figure 11:
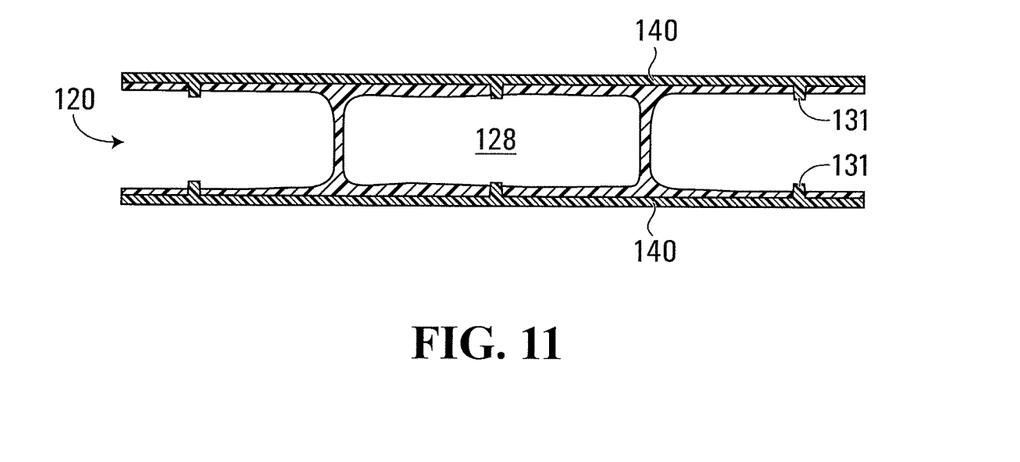
FIG. 11 is a side schematic view of a slab with a reinforcing layer attached thereto.

In yet a further alternate embodiment, holes 131 in the resulting slab may provide attachment points for slab 120, as depicted in FIG. 11. As illustrated, holes 131 may serve as attachment holes for a reinforcing, protective or aesthetic layer 140, or to otherwise attach slab 120, 120' to another structure in use. Thus holes 131 may be used to attach slab 120 to a structure, or to apply a layer 140 to a surface of slab 120.

In yet other alternate embodiments, a reinforcing material in the form of a porous sheet or the like may be interposed between platens 102, 106 and stretchable material 100, during the formation of slab 120. The reinforcing material may take the form of porous micro-fiber material, and may adhere to, or be embedded in the resulting slab 120 proximate the top and/or bottom surface of slab 120. The porous nature of the reinforcing material may still allow introduction of a fluid (e.g. air or other gas) during stretching to cause formation of pockets 117.

EXAMPLE 1

Force-displacement Fabrication Curves

Figure 12:
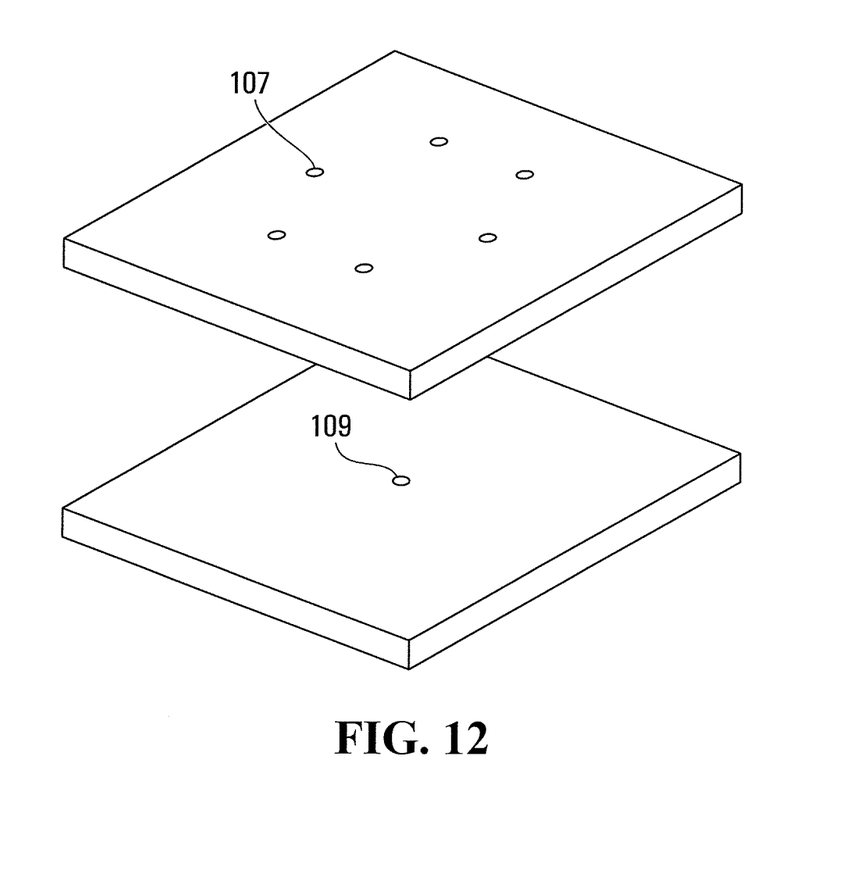
FIG. 12 illustrates an example arrangement of platens.
Figure 13:
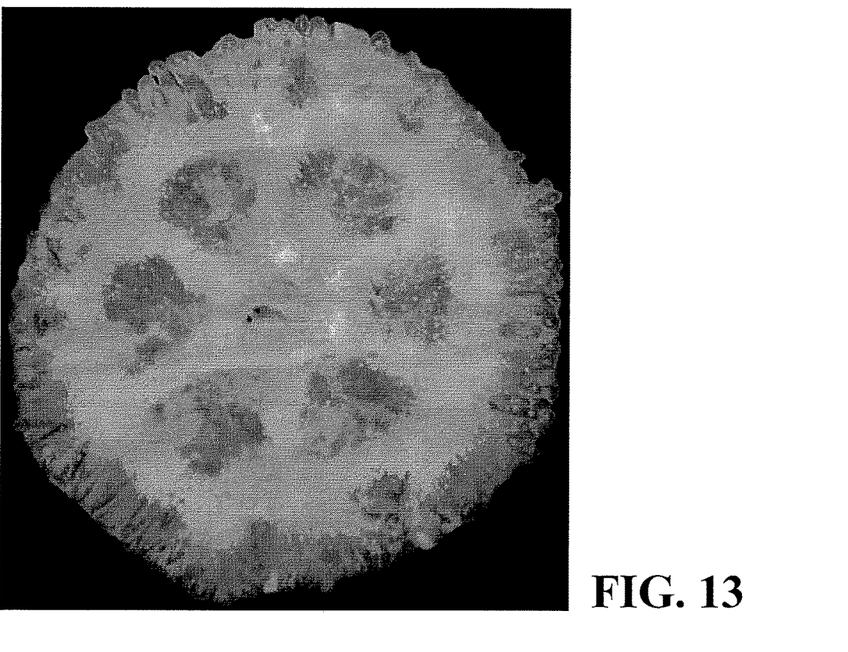
FIG. 13 is a photograph of resulting slab.

FIG. 12 is a schematic plan view of an example bottom platen 102. The top platen 106 (not specifically illustrated) had a central hole 1.6 mm in diameter, while the bottom platen 106 had six 1.6 mm diameter holes 106 arranged in a regular hexagonal pattern of edge length 60 mm. FIG. 13 shows the force necessary to separate opposed platens 102', 106 as a function of pull rate when fabricating an example cellular slab 120, photographically depicted in FIG. 13.

The upper and lower aluminum platens 102', 106 had been heated to 175° C. with a 100 mm diameter and 1.4 mm thick polymer disc (*Borealis* Daploy HMS WB135 Polypropylene, melt temperature of 165° C.) placed between the platens 102', 106.

Once platens 102', 106 reached a desired temperature of 175° C. and stretchable material 100 had melted, a small compressive pre-load of 200 N was applied to platens 102', 106 to ensure good adhesion before melted stretchable material 100 was stretched to a height of 9 mm.

Figure 14:
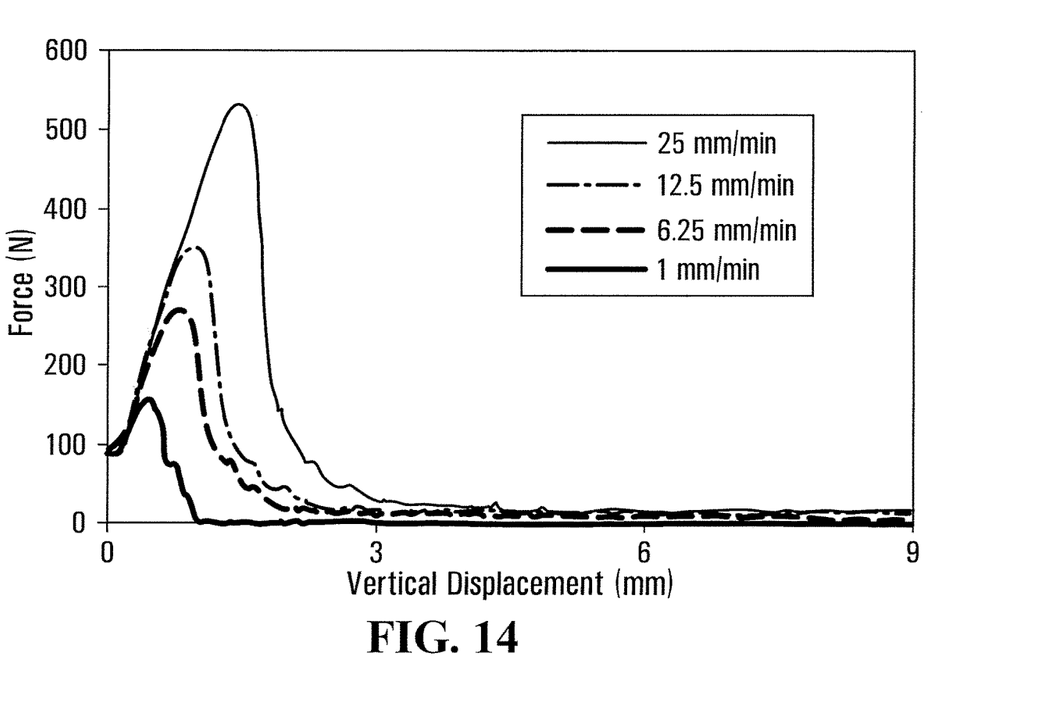
FIG. 14 is a graph showing force to separate platens of FIG. 12.
Figure 15:
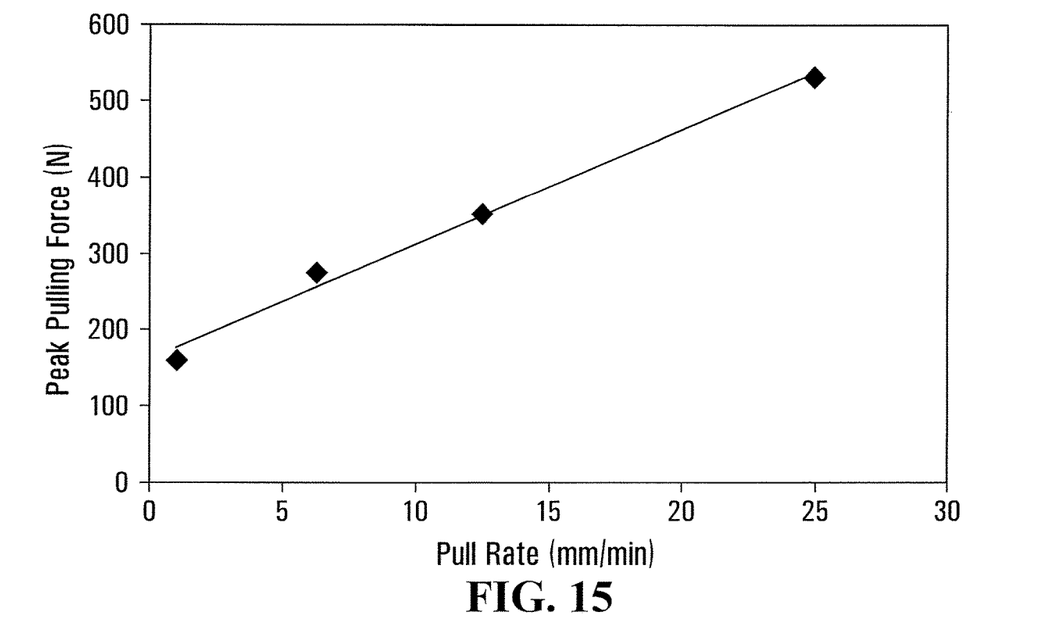
FIG. 15 peak stretching force as a function of melt stretch pulling rate for the example of FIG. 12.

Four force-displacement curves are shown in FIG. 14 reflecting pull rates that ranged from 1 mm/min (lowest peak) to 25 mm/min (highest peak). The maximum peak force, graphed in FIG. 15, increased from approximately 160 N to 500 N as the pull rate increased from 1 mm/min to 25 mm/min.

EXAMPLE 2

Stress-strain Curves During Uniaxial Compression

Figure 16:
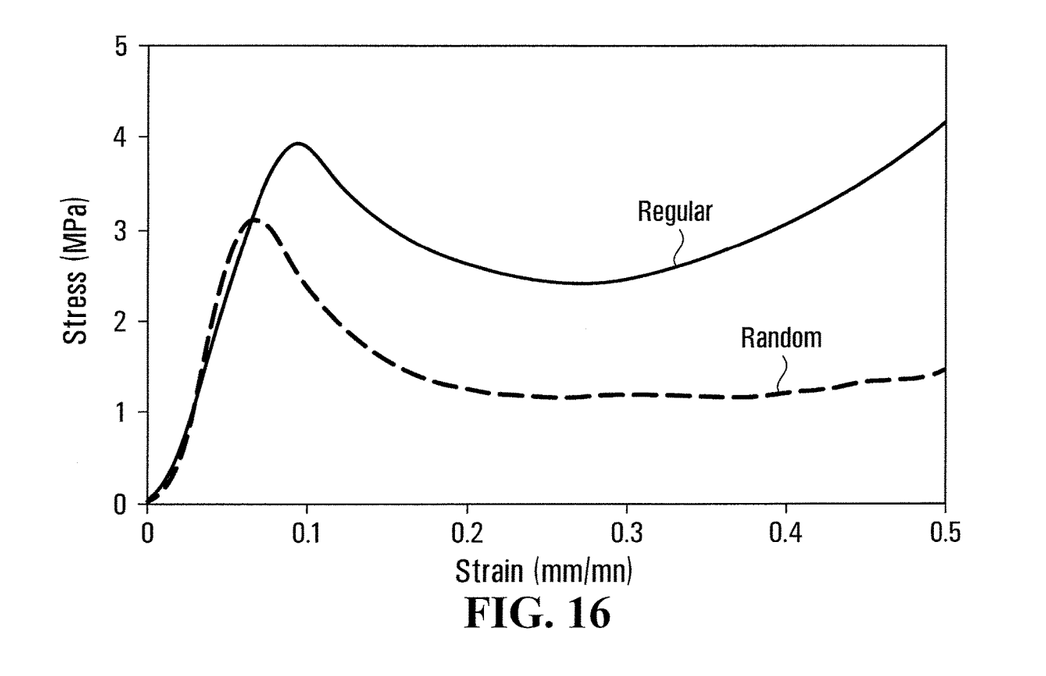
FIG. 16 is a graph showing uni-axial compression for random celled cellular material, and regular cellular material.

FIG. 16 illustrates a measured compression stress-strain curves for regular (closed) cell cellular material, as described above, and for randomly distributed cell material, as disclosed in PCT Publication WO 2012/162784. The solid black line in FIG. 16 shows measured compression stress-strain curve for the regular (and closed cell) structure created by using a hexagonal array of holes in the plates (FIG. 12), while the broken line shows the case for a stochastic (and open cell) structure (as for example disclosed in PCT Publication WO 2012/162784) created by using hole-free platens. Both samples are formed from the same high melt strength polypropylene starting material—Borealis Daploy HMS WB135 Polypropylene.

Samples were made using metal plates without apertures (as disclosed in PCT Publication WO 2012/162784), while in the other case the samples were made using the same hole pattern shown in FIG. 12.

Both samples had an overall relative density of 14% (density of the cellular material divided by the density of the bulk polymer). The holes in the metal platens allow the geometry of the cellular architecture to be controlled, which can lead to enhanced mechanical properties.

Of note, both the peak strength (initial maximum stress) and the valley strength (subsequent minimum stress) are higher for regular cellular structure (values summarized in the Table I below). The load drop following the initial peak was less severe for the regular (closed cell) cellular material than for the stochastic (open cell) cellular material, which suggests that more energy can be absorbed by the regular cellular structure during compression.

TABLE I

| Sample | Closed Cell | Open Cell |
| --- | --- | --- |
| Peak Strength (MPa) | 3.9 | 3.1 |
| Valley Strength (MPa) | 2.4 | 1.3 |
| Valley/Peak (%) | 62% | 42% |

When a list of items is given herein with an "or" before the last item, any of the listed items or any suitable combination of the listed items may be selected and used. For any list of possible elements or features provided in this specification, any sublist falling within a given list is also intended. Similarly, for any range provided, any sub-range falling within a given range is also intended.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A method of forming a cellular slab, comprising:
providing two opposing surfaces, with at least one of said two opposing surfaces comprising apertures extending therethrough;
providing granules of a melt-stretchable material between said two opposing surfaces;
melting said granules of the melt-stretchable material between said two opposing surfaces to form a uniform viscous molten layer of melted melt-stretchable material, through applying heat to the melt-stretchable material such that it adheres to said two opposing surfaces;
moving at least one of said two opposing surfaces away from the other to stretch said melted melt-stretchable material between said two opposing surfaces such that the melted melt-stretchable material continues to adhere to said two opposing surfaces during stretching and forms cells therebetween, while allowing a fluid to enter said melted melt-stretchable material through said apertures to define voids in said melted melt-stretchable material at locations defined by said apertures;
solidifying said melted melt-stretchable material to form said cellular slab.

2. The method of claim 1, wherein said melt-stretchable material comprises a thermoplastic.

3. The method of claim 1, wherein said melted melt-stretchable material comprises a thermosetting stretchable material.

4. The method of claim 3, wherein said thermosetting material comprises at least one of epoxy resin, polyester, polyurethane, phenolics, epoxy, synthetic rubber.

5. The method of claim 1, wherein said fluid comprises air.

6. The method of claim 1, wherein said two opposing surfaces are substantially parallel.

7. The method of claim 1, wherein said two opposing surfaces are substantially flat.

8. The method of claim 1, wherein said melted melt-stretchable material has surface layers facing said two opposing surfaces, respectively, and wherein the surface layers adhere to the two opposing surfaces.

9. The method of claim 1, wherein said apertures are formed in only one of said two opposing surfaces.

10. The method of claim 1, wherein said apertures are formed in a top one of said two opposing surfaces.

11. The method of claim 1, wherein said apertures are formed in both said two opposing surfaces.

12. The method of claim 11, wherein each of said apertures is aligned in one of said two opposing surfaces is generally aligned with a corresponding aperture in the other one of said two opposing surfaces.

13. The method of claim 1, wherein said melt-stretchable material comprises reinforcing material.

14. The method of claim 13, wherein said reinforcing material comprises at least one of carbon fibers, iron fibers, alloy fibers, and nano-particles.

15. The method of claim 1, further comprising interposing a reinforcing layer between said melt-stretchable material and at least one of said two opposing surfaces.

16. The method of claim 1, further comprising limiting fluid flow through at least some of said apertures as said at least one of said two opposing surfaces away is moved from the other.

17. The method of claim 1, wherein the melted melt-stretchable material forms a continuous sheet of molten mass without substantial air gaps prior to said moving.

18. The method of claim 1, further comprising compressing said melted melt-stretchable material to form a continuous sheet of molten mass without substantial air gaps.

19. The method of claim 1, wherein after said melting and prior to said moving, said uniform viscous molten layer has no substantial air gaps.

* * * * *